Nov. 3, 1936.                J. A. DORST                2,059,212
                        SUSPENSION FOR VEHICLES
                          Filed Jan. 11, 1936
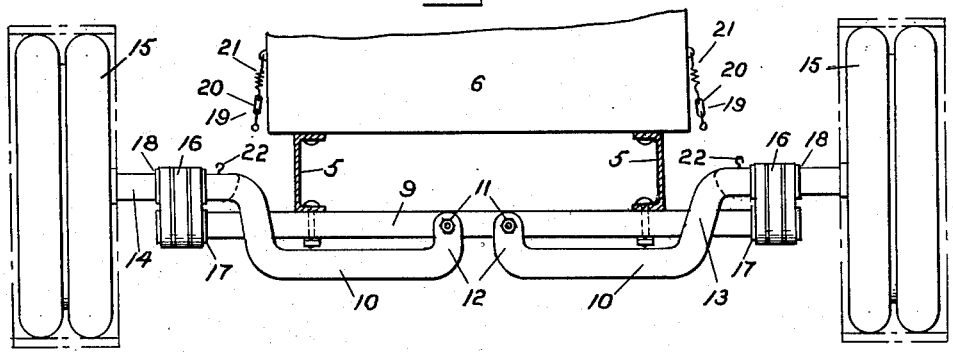
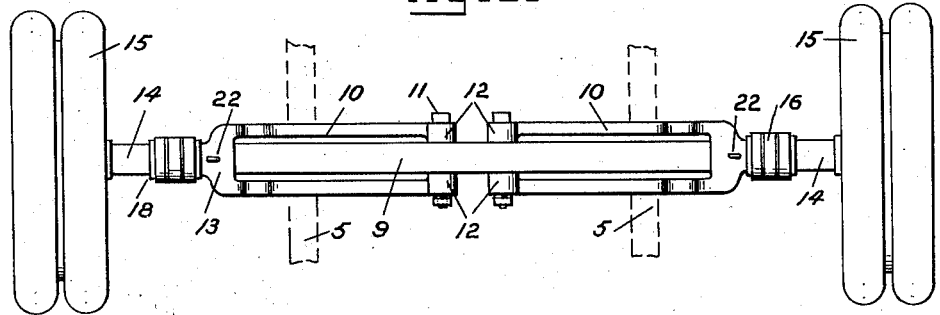
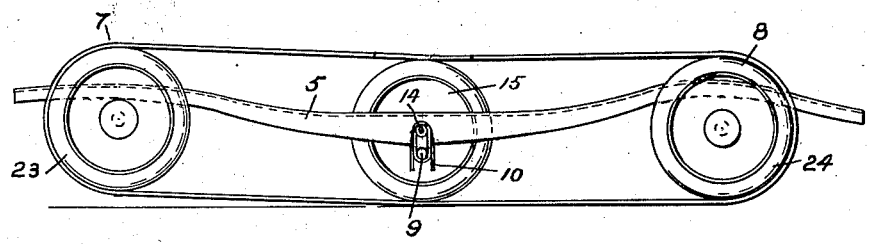
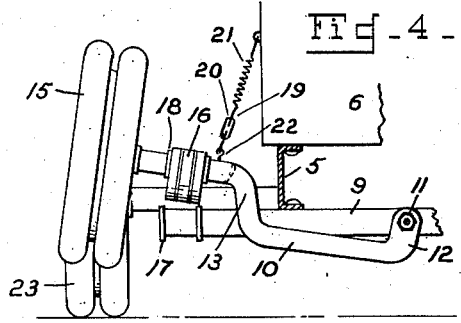
Inventor
James A. Dorst
By W.N. Roach
Attorney Patented Nov. 3, 1936

2,059,212

UNITED STATES PATENT OFFICE 2,059,212

SUSPENSION FOR VEHICLES

James A. Dorst, United States Army, San Francisco, Calif.

Application January 11, 1936, Serial No. 58,710

4 Claims. (Cl. 305—3)

(Granted under the act of March 3, 1883, as amended April 30, 1928; 370 O. G. 757)

The invention described herein may be manufactured and used by or for the Government for governmental purposes without the payment to me of any royalty thereon.

This invention relates to a suspension for a vehicle.

In converting a commercial automobile into a vehicle which may utilize either wheel or belt traction it is necessary to supply auxiliary wheels in order to more effectively distribute the load and aid in retaining the track.

The purpose of this invention is to provide an auxiliary suspension unit for a commercial vehicle which is simple, inexpensive, readily applicable to the chassis frame without modifying the frame, and which may be quickly and easily adjusted to operative and inoperative position.

With the foregoing and other-objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawing, wherein:

Fig. 1 is a transverse sectional view of a chassis frame showing the auxiliary suspension in elevation.

Fig. 2 is a plan view.

Fig. 3 is a view in side elevation of the chassis frame, near wheel of the intermediate group being removed.

Fig. 4 is a view in front elevation showing one of the auxiliary suspension units in inoperative position.

Referring to the drawing by characters of reference:

The vehicle comprises a commercial automobile chassis, that shown being a Model 1935 Ford including a frame 5, a body 6, a front wheel axle unit 7 and a rear wheel axle unit 8.

The auxiliary suspension comprises a transversely disposed bar 9 fixed to the frame intermediately of the front and rear axle units and extending on each side of the frame. A pair of similar oppositely disposed arms 10—10 are each mounted on a pivot pin 11 in the center portion of the bar 9 and are movable in the plane of the bar.

The inner portion of each arm underlies the bar and is preferably bifurcated so that its inner ends 12—12 may engage opposite sides of the bar. A bifurcated offset 13 straddles the bar at the outer side of the frame 5 to position the outer spindle 14 above the end of the bar 9. The spindle 14 extends beyond the bar and carries twin wheels 15.

An elastic cord or band 16 is wrapped about each end of the bar 9 and the corresponding spindle 14 and is confined between spaced collars 17—17 and 18—18 respectively formed on these members. The cords are assembled under a tension that will preferably cause the front end of the vehicle to be raised about two inches. The loops of the cord are readily slipped on and off of the bar 9 by depressing the opposite side of the vehicle and thereby causing the end of the bar 9 to approach the spindle.

When the elastic cord is disconnected from the bar 9 the arm 10 is moved to and held in inoperative position clear of the ground by means of a link 19 including a turnbuckle 20. The link is carried by the body through a spring 21 and is attached to a hook 22 on the arm.

The axle units 7 and 8 are supplied with twin wheels respectively 23 and 24 for the purpose of carrying an endless track 11 on each side of the vehicle. When the vehicle is being operated with the tracks in place the arms 10—10 are lowered into operative position, the front wheels are locked against turning in any convenient manner, and steering is accomplished by a divided brake system as heretofore proposed in the art.

I claim:

1. In a vehicle, a frame, axle units supporting the frame, a bar carried transversely of the frame and positioned between the axle units, a pair of oppositely disposed arms pivoted to the center portion of the bar, each arm having a bifurcated inner end disposed underneath the bar and a bifurcated offset straddling the bar outside of the frame, a spindle on the offset and overlying the end of the bar, a wheel on the spindle, an elastic cord looped about the spindle and the bar, and under sufficient tension to raise one end of the vehicle, and means for holding the arm in a raised position when the elastic cord between the spindle and bar is disconnected.

2. In a vehicle, a frame, axle units supporting the frame, a bar carried transversely of the frame and positioned between the axle units, a pair of oppositely disposed arms pivoted to the center portion of the bar, each arm having a bifurcated inner end disposed underneath the bar and a bifurcated offset straddling the bar outside of the frame, a spindle on the offset and overlying the end of the bar, a wheel on the spindle, an elastic cord looped about the spindle and the bar, and means for holding the arm in a raised position when the elastic cord between the spindle and bar is disconnected.

3. In a vehicle, a frame, axle units supporting the frame, a bar carried transversely of the frame, a pair of oppositely disposed arms pivoted to the bar, each arm having a bifurcated inner end disposed underneath the bar and a bifurcated offset straddling the bar outside of the frame, a spindle on the offset and overlying the end of the bar, a wheel on the spindle, an elastic cord looped about the spindle and the bar, and means for holding the arm in a raised position when the elastic cord between the spindle and bar is disconnected.

4. In a vehicle, a frame, a bar carried transversely of the frame, a pair of oppositely disposed arms pivoted to the bar, each arm having a bifurcated inner end disposed underneath the bar and a bifurcated offset straddling the bar outside of the frame, a spindle on the offset and overlying the end of the bar, a wheel on the spindle, and an elastic cord looped about the spindle and the bar.

JAMES A. DORST.